United States Patent [19]

Adams

[11] Patent Number: 5,340,634

[45] Date of Patent: Aug. 23, 1994

[54] ELASTIC ARTICLES HAVING PARALLEL GRIPPING SURFACES

[75] Inventor: William E. Adams, Portersville, Pa.

[73] Assignee: Adams Mfg. Corp., Portersville, Pa.

[21] Appl. No.: 2,057

[22] Filed: Jan. 8, 1993

[51] Int. Cl.$^5$ ................................................ B32B 3/10
[52] U.S. Cl. .................................... 428/131; 428/134;
428/542.2; 264/DIG. 30
[58] Field of Search ................ 264/DIG. 30; 428/131,
428/137

[56] References Cited

U.S. PATENT DOCUMENTS 3,949,125 4/1976 Roberts .................................. 428/16
4,734,027 3/1988 Adams .................................. 264/334

Primary Examiner—George F. Lesmes
Assistant Examiner—Kathryne E. Shelborne
Attorney, Agent, or Firm—Buchanan Ingersoll

[57] ABSTRACT

In an injection molding process for creating gripping surfaces in plastic articles a mold is provided which positions a cavity within the plastic article near where the gripping surface is needed. The parameters of the injection molding processes can be controlled to either increase or decrease the gripping surfaces by regulating the amount of shrink in the plastic. Three of the controlled parameters that determine the size of the gripping surface are the injection pressure, melt index of the plastic and the temperature of the cooling water.

6 Claims, 2 Drawing Sheets

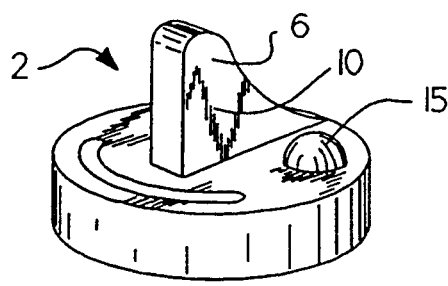
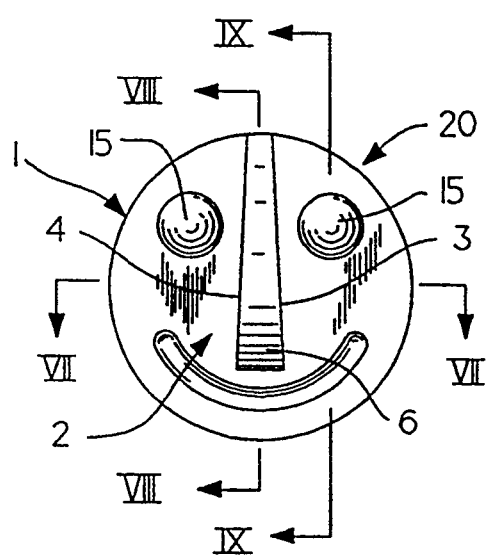
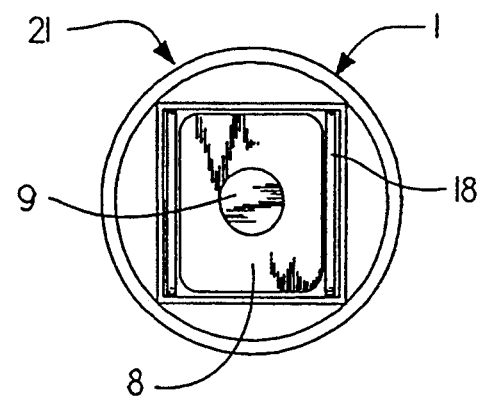
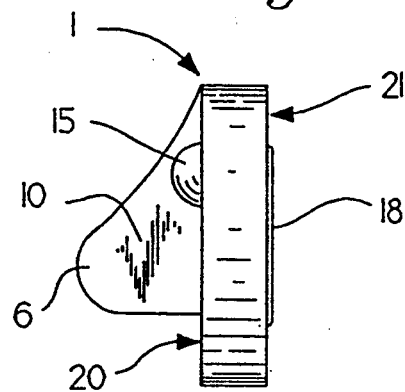
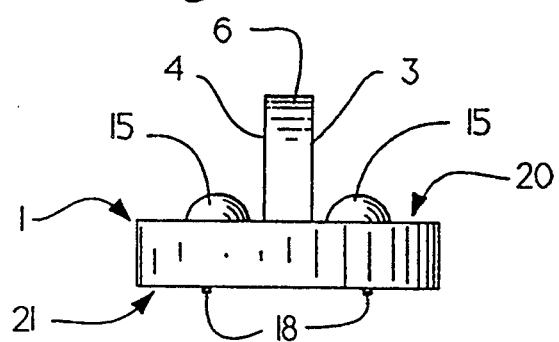
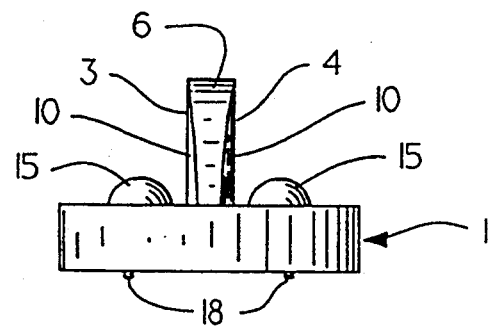

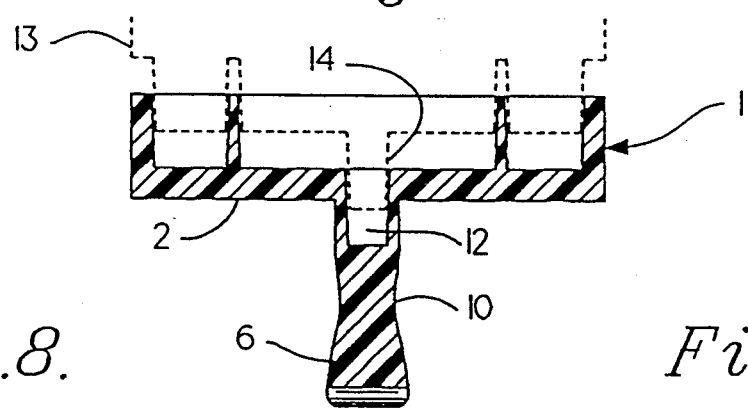
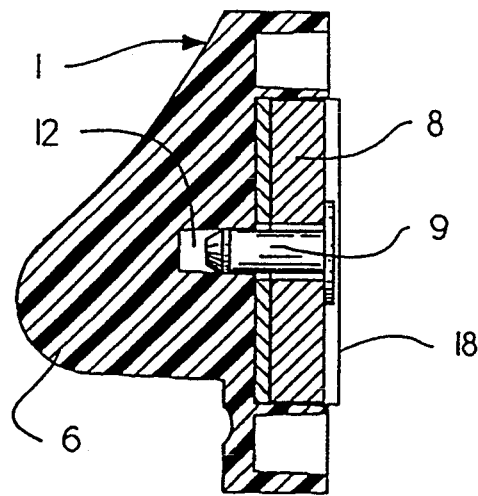
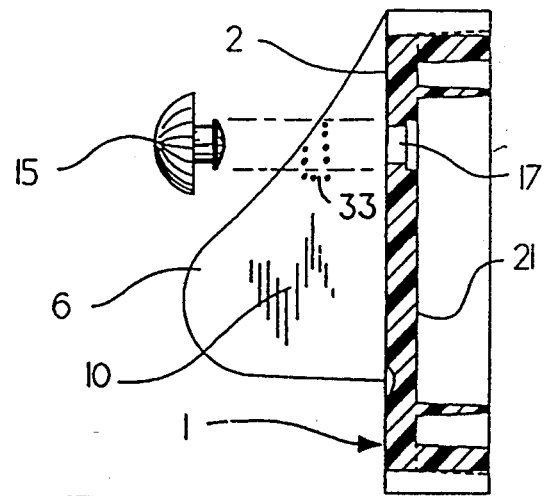
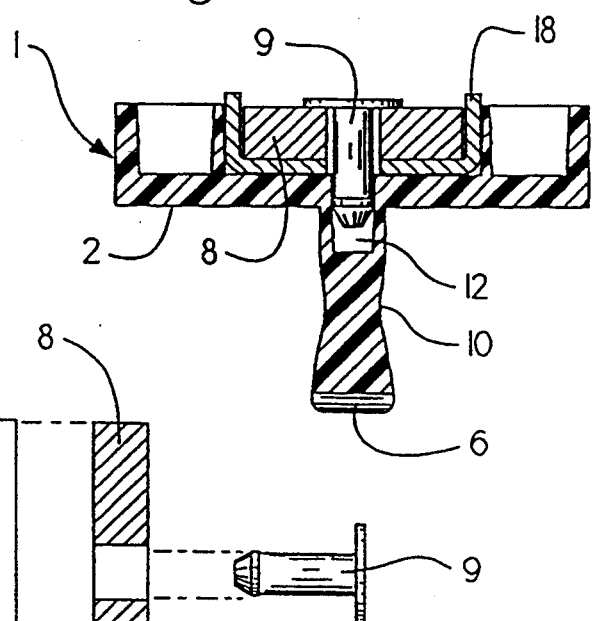
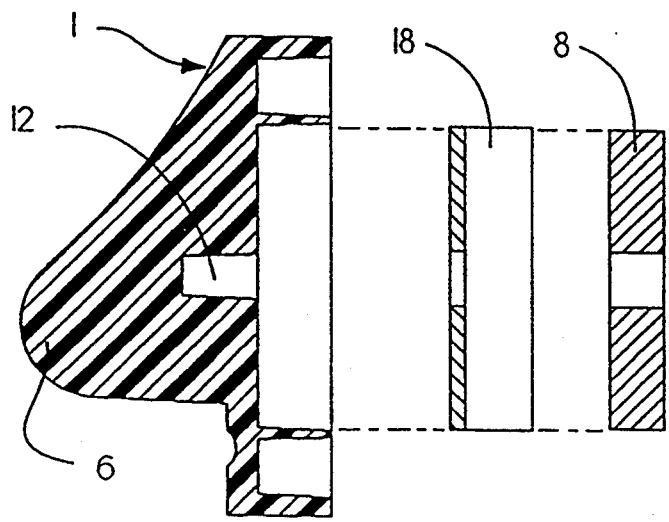

ELASTIC ARTICLES HAVING PARALLEL GRIPPING SURFACES

BACKGROUND OF THE INVENTION

1. Field of the Invention

The present disclosure relates to creating gripping surfaces in plastic objects utilizing an injection molding process. More particularly, the present disclosure relates to regulating the size and shape of the gripping surface by adjusting the molding parameters of the injection molding process.

2. Description of the Related Prior Art

It is well known that plastic articles which are injection molded are susceptible to shrink. Plastic articles which exhibit shrink result in a product having uneven surfaces and depressions. This is felt to be a disadvantage of injection molded plastics. The prior art attempted to overcome these irregularities in injection molded plastic articles. Most of these efforts have involved careful selection of the molding materials and control of temperatures during the molding process. Another approach, set forth in my U.S. Pat. No. 4,734,027, issued Mar. 29, 1988, is to provide a pool of plastic material adjacent the cavity containing the article to be molded. The pool provides excess plastic material which is drawn into the cavity as the article cools thereby maintaining even surfaces on the article.

SUMMARY OF THE INVENTION

Rather than minimize or eliminate depressions the present invention provides a method of positioning the depressions to form gripping surfaces in a plastic article that is formed by an injection molding process. The method takes advantage of the known shrinkage property of plastics which has heretofore largely been considered to be a disadvantage. A mold is provided which positions a cavity in the plastic article near where a gripping surface is intended. This causes pronounced shrinkage of the article near the cavity. Thus, one can cause depressions to be formed at desired positions on the article by placement of cavities in the article. These depressions when properly placed provide a useful gripping surface.

After the article is injection molded, the article and the mold are cooled with water. The present disclosure further provides for increasing the size of gripping surfaces by increasing the temperature of the water which is used for cooling. By decreasing the temperature of the cooling water of the injection molding process the gripping surfaces would also decrease.

Yet another way of regulating the size of the gripping surfaces in plastic articles is to increase the amount of mass of plastic in the position where the gripping surface is intended. Thus, by increasing the mass you also increase the shrink and thus, increase the size of the gripping surface.

The present disclosure provides for the plastic article to be made from any plastic. Preferably the plastic article is made from one of the group of plastics consisting of polyethylene, polypropylene, polyvinylchloride, polystyrene, polycarbonate, and nylon.

The present disclosed method of forming a gripping surface in a plastic material further provides for adjusting the size of the gripping surface by choosing a plastic material with a high melt index in the case where a larger gripping surface is desired. Alternatively, if a smaller gripping surface is desired a plastic with a lower melt index should be chosen.

The present disclosure provides yet another control of the gripping surface. When the mold is created the greater the amount of steel mold in contact with the gripping surface the less shrink there would be in the mold. The less shrink there would be in the mold, the smaller the gripping surface. The amount of shrink can vary among different types of steel molds. This occurs because some steels, such as berylium copper, conduct heat better than other steels, such as tool steel.

Some plastic will also shrink more if it is processed at the upper ranges of its processing temperature. By combining high heats, chilling temperatures, speed of processing and types of additives, shrink may be increased in the area near the cavity.

The present disclosure illustrates the disclosed method being utilized in the production of an article having a pull tab extended therefrom. In this instance, the article is a decorative magnet in the form of a smiley face having a nose shaped tab. The gripping surfaces are located on the nose. This decorative plastic face could also be positioned on a suction cup and again the nose would contain the gripping surface making it easy to grasp the decorative plastic face.

The present disclosure further provides for the method of forming gripping surfaces being utilized in the production of door knobs made from plastics. The gripping surfaces would be placed at positions on a door knob making it easier to grip and turn the door knob, when entering or exiting a room.

Other details, objects and advantages of the invention will become apparent as the following description of a present preferred embodiment thereof and a present preferred method of practicing the same proceeds.

BRIEF DESCRIPTION OF THE DRAWINGS

In the accompanying drawings I have shown a present preferred embodiment of the invention.

FIG. 1 is a perspective view of a present preferred embodiment.

FIG. 2 is the front view of the preferred embodiment.

FIG. 3 is the back view of the preferred embodiment.

FIG. 4 is the side view of the preferred embodiment.

FIG. 5 is the bottom view of the preferred embodiment.

FIG. 6 is the top view of the preferred embodiment.

FIG. 7 is the cross-sectional view of the embodiment along line VII—VII of FIG. 2 wherein a portion of the mold is shown in chain-line as it is being opened.

FIG. 8 is the cross-sectional view of the embodiment along line VIII—VIII of FIG. 2.

FIG. 9 is a cross-sectional view of the embodiment along line IX—IX of FIG. 2 wherein the eye is shown disconnected from the face.

FIG. 10 is a cross-sectional view of the embodiment along line VIII—VIII of FIG. 2 wherein the magnet is shown disconnected from the face.

FIG. 11 is a cross-sectional view of the embodiment along line VIII—VIII of FIG. 2 wherein the magnet is shown via a rivet.

DETAILED DESCRIPTION OF THE PREFERRED EMBODIMENT

The process of making a gripping surface in a plastic material is done by taking advantage of the susceptibility of plastics to shrinkage when cooled in an injection molding process. The gripping surface is positioned on the plastic article by providing a mold which places a cavity on the opposite side of the plastic article with respect to where the gripping surface is intended. This will cause more of a shrink near the cavity and thus create a gripping surface. We take full advantage of the principle that where there is the most mass in the plastic article there will be more shrink than at a location having less mass. Thus, by providing a cavity adjacent to and opposite of the gripping surface, there is a negative mass or cavity which as compared to the area of the gripping surface will have a greater mass thus creating more shrink in the plastic.

There are many parameters in the injection molding process that can be adjusted to allow for more or less shrinkage. One of these is the temperature of the cooling water. Water is used to cool the plastic article after it has been injection molded. Usually there are electric band feeders in the injection mold machine to regulate the temperature of the cooling water. If there are five bands then you might have a range of temperatures for the bands of from 290° to 330° F. having a 10° increment (290°, 300°, 310°, 320°, 330° F.). The temperature affects the shrink proportionately in that if one deceases the temperature of the water being used to cool the injection molded plastic article one will also decrease the shrink. By decreasing the temperature of the cooling water the plastic article will cool faster and not allow for a large amount of shrink. If after the plastic article has been injection molded for the first time and the gripping surface is not of the right proportion, one can adjust the proportion of the shrink of the subsequent injected plastic article by adjusting the water temperature proportionately.

Another parameter of the injection molding process that affects the proportions of the gripping surface is the melt index of the plastic. Plastic material is available at a large variety of melt indexes. The higher the melt index of the plastic the more shrink and thus, the greater the shrink of the gripping surface. The lower the melt index the smaller the shrink of the gripping surface. The melt index indicates how fast the plastic will melt in that, the higher the melt index the lower the temperature necessary to melt the plastic before it can be injection molded. The melt index also is related to the size of the shrink. If the plastic has a high melt index, the plastic will flow very easily and the plastic will take long to cool. When the plastic takes long to cool the gripping surface or the shrink will increase. For example, if the plastic has a melt index of 20 and another plastic has a melt index of 8, the plastic with the melt index of 20 will take longer to cool and will flow faster at the same temperature than the plastic with the melt index of 8. Thus, the plastic article formed with the plastic having a melt index of 20 will have greater shrink and a greater gripping surface than the plastic article formed from the plastic material having a melt index of 8. Hence, the melt index is another parameter of the injection molding process that can affect the gripping surface.

Both the melt index and the temperature of the cooling water in the injection mold can be adjusted in the process and fine tuned to get the exact gripping surface which is desired.

Yet another factor to be considered when creating a gripping surface by injection molding is the configuration of the mold and the amount of surface area of the steel mold in contact with the gripping surface of the plastic article being molded. The steel mold is a good thermal conductor and will transfer the heat from the plastic article being injection molded away from the portion which is in contact with the steel. Thus, the plastic article will cool faster at the interface between the steel mold and the plastic article which results in less shrink of the plastic. A cylindrical protrusion is preferably provided in the mold to create a cavity in the article being molded. Not only does the cylindrical protrusion form the cavity, but the protrusion also acts as a thermal conductor to transfer heat from the injected plastic article to the steel mold. The steel mold acts as a heat sink. The protrusion in particular, increases the cooling because it provides more surface area that is in contact with the injected plastic. This transfer of heat allows the plastic article to cool faster and thus, decreases the shrink of the plastic.

The last parameter to affect the gripping surface and thus, the shrink in the plastic article being injection molded is the injection pressure. If the injection pressure is high enough and is maintained throughout the molding process including the cooling stage, the pressure will reduce the amount of shrink. By maintaining the pressure against the plastic being injected and then cooled, the plastic will be forced to fill the mold fully. By maintaining this pressure through the cooling state, the plastic article will not have an opportunity to shrink while cooling. Therefore, by controlling the pressure you can also control the shrink. Hence, the size of the gripping surface of the plastic article can be regulated by maintaining an injection pressure throughout the cooling process that allows for a certain amount of shrink. For any given article the amount of shrink which can be varied by pressure changes is most easily determined by making product samples at different pressures.

One example of a plastic article 1 having gripping surfaces is shown in FIGS. 1 through 11. The above-described process was used to create gripping surfaces on this plastic article which is a decorative plastic article that can be mounted on a magnet or pin (not shown) and thus, attached to objects for holding papers and decoration, respectfully. The decorative plastic could also be mounted on a clip (not shown) for holding papers together. As can be seen in FIGS. 1 and 2 the decorative plastic piece is a face 2 having a disk shape with two sides 20, 21, a nose portion 6 and two eyes 15. The eyes 15 are attached to the face through hole 17 by utilizing a friction fit as shown in FIG. 9. A magnet 8 is received within plate members 18 and attached to the back of the decorative plastic piece by rivet 9 as shown in FIGS. 8 and 10. Nose portion 6 extends perpendicular from the side 20 of the face 2. The nose portion 6 has two substantially parallel sides 3 and 4. Gripping surfaces 10 are formed on each side 3 and 4 allowing for the piece to be easily handled. The gripping surfaces 10 can be better seen in FIG. 4 and also in FIG. 6. These gripping surfaces were created by adjusting the parameters discussed above in the injection molding process.

The gripping surfaces were created by placing a cavity 12 as can be seen in FIG. 7 and 10 opposite to and adjacent the gripping surface 10. A three-piece mold made from steel was utilized to create the cavity. The mold partially shown in chain line includes segment 13 which has a cylindrical pin 14 which forms cavity 12. The cavity 12 shown here has a diameter of 0.150 inches. Again, this cavity provides a negative mass adjacent to and on the opposing side of the gripping surface which results in shrinkage of the plastic article which creates the gripping surface.

The plastic article 1 shown in the drawings can be used to hang objects from a surface such as a wall (not shown). If desired one could provide a slot 33 shown in dotted line in FIG. 9 to receive a hanger.

The decorative plastic piece 1 was injected at a temperature of approximately 370° to 380° F., at an injection pressure of approximately 1200 psi and was cooled at an average water temperature of approximately 60° F. The complete cycle time was approximately 20 seconds. Specifically, the decorative face 2 was made from polypropylene, but it could be made from any plastic since all plastics will respond in the above-described manner. Some other examples of plastics that could be used would be polycarbonate, polyethylene, polystyrene, polyvinylchloride and nylon.

Other examples that may utilize the injection molding process to create a gripping surface are door knobs made from plastic. The gripping surface would be placed in mechanically advantageous position in order that the door knob will be easier to turn. This process on the door knob can be used on any plastic article which has gripping surfaces or in which it would be advantageous for gripping surfaces to be present.

While I have shown and described a present preferred embodiment of the invention and have illustrated a present preferred method of practicing the same, it is to be distinctly understood that the invention is not limited thereto, but may be otherwise variously embodied within the scope of the following claims.

I claim:

1. A decorative plastic object comprised of i) a body having a face and a back, and ii) a nose extending from the face, the nose having two substantially parallel sides and a cavity positioned on the back of the face above the gripping surface on each side of the nose, the cavity sized and positioned to create on each side a concave gripping surface adjacent the cavity which concave gripping surface is produced by providing a mold configured to produce the object and having a pin which defines the cavity; injecting plastic into the mold to form the object; and cooling the object thereby causing the object to shrink and the gripping surface on each parallel side to be formed.

2. A decorative plastic object as recited in claim 1 further comprising the cavity having a diameter of 0.150 inches.

3. A decorative plastic object as recited in claim 1 wherein the plastic object is polystyrene.

4. A decorative plastic object as recited in claim 1 wherein a temperature of a fluid used to cool the plastic object is approximately 60° F.

5. A decorative plastic object as recited in claim 1 wherein an injection temperature of approximately between 370° to 380° F. is utilized as the temperature of the plastic being injected.

6. A decorative plastic object as recited in claim 1 wherein an injection pressure of approximately 1200 psi is utilized.

* * * * *

UNITED STATES PATENT AND TRADEMARK OFFICE
CERTIFICATE OF CORRECTION

PATENT NO.   : 5,340,634
DATED        : August 23, 1994
INVENTOR(S)  : WILLIAM E. ADAMS It is certified that error appears in the above-indentified patent and that said Letters Patent is hereby corrected as shown below:

On the title page,
At [54] change "Elastic" to --Plastic--.

Signed and Sealed this

Eighteenth Day of October, 1994

*Attest:*

BRUCE LEHMAN

*Attesting Officer*   *Commissioner of Patents and Trademarks*